April 28, 1959     K. M. BISSELL     2,883,820
RAKE FINGER CONSTRUCTION
Filed Sept. 4, 1956

Kathleen M. Bissell
INVENTOR.

BY
ATTORNEY

2,883,820

RAKE FINGER CONSTRUCTION

Kathleen M. Bissell, Corona del Mar, Calif.; William J. Bissell, executor of said Kathleen M. Bissell, deceased, assignor to Bertram H. Marlor, Corona del Mar, and C. Lauren Maltby, Sierra Madre, Calif.

Application September 4, 1956, Serial No. 607,847

1 Claim. (Cl. 56—400.17)

This invention relates to garden implements and more especially to rakes.

An object of the invention is to provide a simple, practical and inexpensive article of the character described.

Another object of the invention is to provide an improved rake for the removal of undesirable or parasitic growths found in lawns.

An additional object of the invention is to provide an improved rake effective in removing crab grass, devil grass and the like from lawns without harmful results to the grass.

Other objects and advantages will appear and be brought out more fully in the following specification, reference being had to the accompanying drawing wherein.

Figure 1:
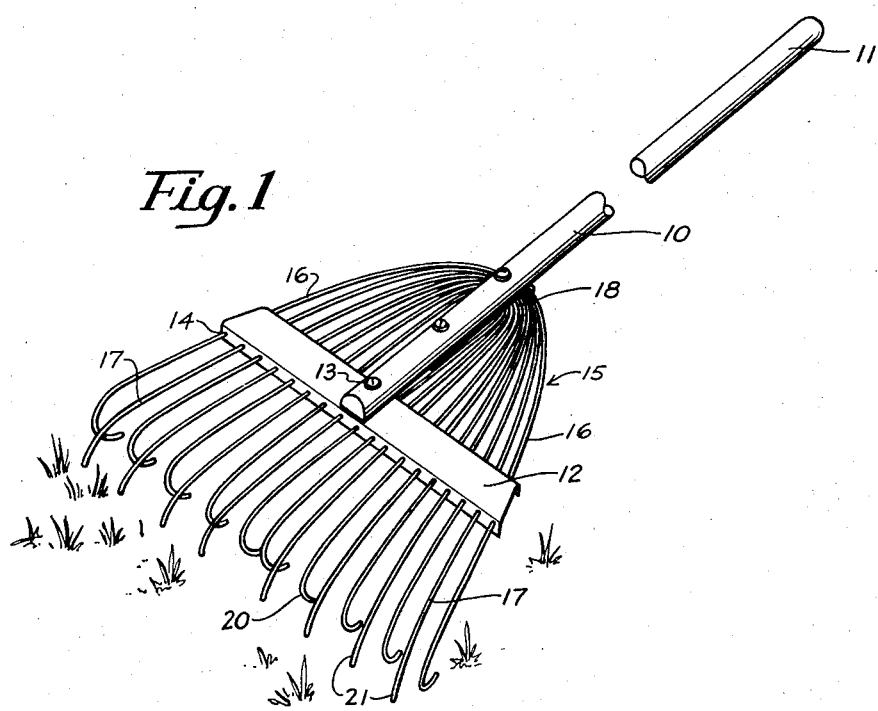
Figure 1 is a perspective view of a rake embodying the invention.
Figure 2:
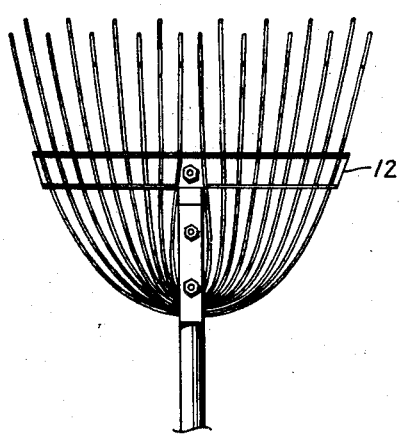
Figure 2 is a top view of the same.
Figure 3:
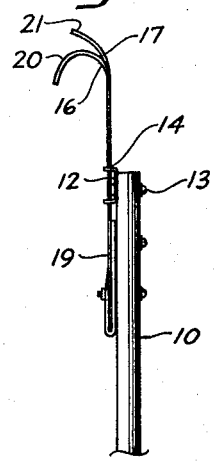
Figure 3 is a side view of the same.

Referring more particularly to the drawing, the rake of this invention comprises an elongated body or shank 10 having at one end a handle 11. At the other end a cross bar 12 is secured to shank 10 as by one or more fasteners 13, the cross bar 12 comprising a channel member having a plurality of apertures 14 in the side walls thereof.

A plurality of fingers 15 are secured to the shank 10 and cross bar 12, and comprise first and second pluralities thereof, 16 and 17, and are shown as being constituted of relatively stiff wire bent in U-shaped formation, the central portions 18 thereof being suitably secured to shank 10 by clamp 19, or otherwise. The fingers 15 are each extended through the apertures 14 of the cross bar 12, and the ends of the fingers are bent or shaped as shown.

The fingers 16 have their ends reversely bent at 20 in a hook-like formation, whereas the ends of fingers 17 extend forwardly and downwardly somewhat gradually as at 21 and beyond the ends 20 of fingers 16. The fingers 16 and 17 are shown disposed in alternate arrangement, however, there may, if desired, be a greater or less number of fingers 16 than fingers 17, the particular arrangement, spacing and actual structure thereof being subject to some variation. The important formation and relation to the invention is that the fingers 16 have reversely bent hooked ends 20, and that the ends 21 of fingers 17 extend forwardly and downwardly so that the depth of engagement of the fingers 16 may be limited or controlled by the fingers 17.

The operation of the invention should be clear from the foregoing description. Figure 1 shows the rake of this invention in substantially operative condition with the handle and shank member 10 inclined at the usual angle in use. During the raking movement the hooks 20 will engage runners of crab grass, devil grass and similar parasitic growths in lawns and remove the same, while the ends 21 of the fingers 17 will serve to limit the distance that finger ends 20 will enter the grassy growth, and the normal grass roots will not be disturbed or damaged during the raking operation.

It will be understood that the foregoing description is illustrative rather than restrictive of the invention, and that changes and modifications may be made without departing from the spirit and scope of the sub-joined claim.

Having described my invention what I claim is:

A rake assembly comprising an elongated handle for a rake head attached to one end thereof, said rake head including a plurality of rod-like fingers arranged in generally fan shape and disposed in uniformly spaced relation to each other, said fingers including depth control fingers and operating fingers, each having an elongate shank extending from said handle with all such shanks being disposed in a common plane, said depth control fingers and said operating fingers being arranged alternately in each half of the rake such that each depth control finger in each half of the rake is bounded on opposite sides thereof by a pair of said operating fingers, each operating finger terminating in a reversely extending end having its extremity lying in a plane forming an acute angle with the plane of its shank and spaced a substantial distance therefrom, each depth control finger terminating in a curved end having its extremity lying in a plane forming an obtuse angle with the plane of its shank, the origins at said shanks of said terminal ends of both fingers being substantially along a common, transverse line beyond the end of said handle with the terminal ends of said depth control fingers projecting forwardly beyond the terminal ends of said operating fingers and with their ends lying substantially in a forward extension of said plane containing the extremities of said depth control fingers to control the engagement of said operating fingers with parasitic low lying grass.

References Cited in the file of this patent

UNITED STATES PATENTS

| 1,174,317 | Heimerl | Mar. 7, 1916 |
| 1,591,738 | Bell | July 6, 1926 |
| 1,925,357 | Withington | Sept. 5, 1933 |
| 2,225,108 | Glascock | Dec. 17, 1940 |
| 2,707,366 | Gartner | May 3, 1955 |